United States Patent Office 3,366,689
Patented Jan. 30, 1968

3,366,689
PROCESS FOR MANUFACTURING KETENES
Chiaki Maeda, Mishima-cho, Mishima-gun, Osaka-fu, and Keiichi Maruo, Shita-shi, Japan, assignors to Daikin Kogyo Kabushiki Kaisha, Osaka-shi, Japan, a juridical person under the law of Japan
No Drawing. Filed Mar. 31, 1965, Ser. No. 444,416
3 Claims. (Cl. 260—585.5)

This invention relates to a novel and useful process for manufacturing ketenes, more particularly to a industrial process for manufacturing ketenes by contact dehydration in gaseous phase of aliphatic carboxylic acids having from 3 to 6 carbon atoms.

An object of the present invention is to provide a process for manufacturing the corresponding ketenes in high yields from lower aliphatic carboxylic acids having from 3 to 6 carbon atoms.

Another object of the invention is to provide the catalysts suitable for manufacturing of the said ketenes from said lower aliphatic carboxylic acids.

Aldoketenes and keto ketenes are derived by thermal dehydration of the corresponding carboxylic acids respectively, but the higher the temperature being applied the more are the thermal decomposition of the starting material and the resultant product, and the other side reactions tending to reduce the yield of the product. Accordingly, in the conventional methods of manufacturing these ketenes, either the derivatives of aliphatic carboxylic acids, namely, acid anhydrides, esters etc. thereof were subjected to thermal decomposition in the presence or absence of any catalyst, or halogenated acid halides were dehalogenated, generally.

These known processes, however, have failed to bring satisfactory yields in spite of the costly starting material used.

The present inventors have continued research of the novel catalysts together with operating conditions thereof for the catalytic dehydration in vapor phase of carboxylic acids, and have finally accomplished this invention which comprises a process for manufacturing ketones, characterized by thermal dehydration conducted by contacting at 400–900° C. for 0.01–3 seconds lower aliphatic carboxylic acids vapor having 3–6 carbon atoms in total of straight or side chain and having at least 1 hydrogen atom at its α-position with a "silica catalyst" whose specific surface area was less than 100 m.$^2$/g., consisting mainly of silica, or with a "silica-boric oxide catalyst" consisting of the mixture of said silica and substantially less than 40 weight percent, preferably 5–30 weight percent of boric oxide.

This invention has a marked feature to enable high yields of ketenes, say more than 40 percent of acids fed and more than 55 percent of acids consumed from lower aliphatic carboxylic acids having 3–6 carbon atoms.

This invention has another specific feature of employing low-cost catalysts under practical conditions.

Another feature of the invention is to afford the industrial manufacture of ketenes under favorable conditions such as short contact time, high yields of products for unit time, the slightest side reaction and capability of recovering and reusing unreacted aliphatic carboxylic acids.

The other features of this invention will be apparent hereinafter.

The lower aliphatic carboxylic acids to be employed in the invention have 3–6 carbon atoms in total of a straight or side chain, the carbon atom at α-position having at least 1 hydrogen atom, for instance, propionic acid, n-butyric acid, isobutyric acid n-valeric acid, caproic caid, 3-methyl pentanoic acid, iso-caproic acid, etc.

Said "silica catalysts" to be employed in the invention consist mainly of silica whose specific surface area is less than, 100 m.$^2$/g. approximately, such as diatomaceous earth, and "Celite" which are almost wholly of silica, and silicates consisting mainly of silica, such as pumice, acid clay, kaolin, aluminium silicate and magnesium silicate and mixtures thereof.

Said "silica-boric oxide catalysts" are mixtures of one of the aforementioned silica catalysts with boric oxide in a proportion of approximately 5–30 weight percent boric oxide in the total weight, the specific surface area of the mixture being less than 100 m.$^2$/g.

The boric oxide used herein is $B_2O_3$ or $B_2O_3$ forming substance by dehydration during heating such as ortho boric acid.

As far as the proportion of boric oxide content of the "silicaboric oxide catalyst" remains with said range, this type of catalysts generally bring better yields than silica catalysts, while the catalysts whose boric oxide contents exceed 40 weight percent will exhibit almost no difference in yields of ketenes from the silica catalysts.

Both types of catalysts as aforementioned respectively provide high yield of ketenes as far as their specific surface areas are less than 100 m.$^2$/g., whereas those of specific surface areas exceeding 100 m.$^2$/g., for example such as an ordinary silica gel of 300–600 m.$^2$/g. can hardly be expected to afford satisfactory yield of ketenes even when the reaction takes place under the optimum conditions such as contact time 0.01–3 seconds at 400–900° C.

The specific surface areas of the silica catalyst grains to be employed in this invention vary as follows: diatomaceous earth; 3–35 m.$^2$/g.; some kind of acid clay; 50–100 m.$^2$/g.; pumice; 0.05 m.$^2$/g. approximately; pulverized fire brick 25 m.$^2$/g. approximately; and kaolin powder 5–80 m.$^2$/g.

However, when said silica gel or the like whose specific surface area is extremely large is employed in mixture with boric oxide and heated so that the resultant specific surface area of the mixture is reduced to less than 100 m.$^2$/g., such a mixture is to be included under the category of silica-boric oxide catalysts to be employed in the present invention.

The silica catalysts such as diatomaceous earth and pumice are employed in the natural state; Celite is prepared from natural mineral by refining such as acid treatment; and aluminium silicate is chemically synthesized by the known methods; all of these catalysts being either pulverized and pelletted or pulverized and made into grains by dry or wet process and further heat-treated where required.

In working the invention, the catalyst as prepared by the abovementioned processes is charged in a reaction tube consiting of a quartz, stainless steel or other heat resistant materials, and in the catalyst layer is inserted a thermocouple tube to control the heat source (the reactor is heated within or from exterior) so as to maintain the temperature range of 400° C.–900° C.

In reaction, the vapor of said lower aliphatic carboxylic acid (vaporized outside the reactor or in front of the catalyst layer in the reactor) is made to react by passing through the catalyst layer for 0.01–3 seconds and the reaction products are quickly subjected to quenching to prevent condensation of the ketone and other side reactions.

The resultant vapor discharged from the reactor is led to the condenser maintained at suitable temperature for ketene (for instance −20° C. for methyl ketene), where unreacted component is recovered by condensation, and then the desired ketene is obtained after condensation by cooling with suitable coolant such as liquid air and subsequent fractional distillation.

For estimating the amount of the resultant ketene, it may be introduced into an aniline solution by which anilide is obtained through the reaction of the ketene and aniline.

In the above case the reduction of reaction temperature and contact time below the abovementioned ranges leads to insufficient production of ketenes, while the increase of these above the ranges brings lower yields due to intensified side reactions.

The reaction temperature of the present invention should be selected to suit the respective aliphatic carboxylic acids to be employed within the range of 400° C.–900° C.

The resultant ketene having more carbon atoms tends to be thermally decomposed more easily at a high temperature, and should desirably be processed at relatively lower temperature within said range.

In the production of dimethyl ketene from isobutyric acid, for instance, by lowering reaction temperature by only 50° C. than when producing methyl ketene from propionic acid, the yield therefrom was markedly improved.

Further, the shortness of contact time, namely 0.01–3 seconds affords considerable advantages for industrial operation by the marked high yields for unit time.

The starting aliphatic carboxylic acids having more carbon atoms generally tend to yield better at a shorter contact time within the range of 0.01–3 seconds.

As regards the reaction pressure, it is theoretically desirable to react under reduced pressure, as said reaction increases in the number of molecules; for instance the reaction under reduced pressure as low as 145 mm. Hg brings an excellent yield.

Further in the present invention, trialkyl phosphate and sulfur compounds such as carbon disulfide which are known as agents suitable for dehydration may be added to the starting aliphatic carboxylic acids.

The reaction in the present invention process is performed under relatively mild conditions of temperature and contact time, so that there is little fear of the loss of the starting aliphatic carboxylic acids due to undesirable side reactions such as turning the materials into decomposed gas or carbonization.

Accordingly, after separating the desired ketene it is possible to recover the unreacted carboxylic acid at a high rate from the reaction product and to recycle it as a reacting material.

The examples of the invention are described hereinafter, not limiting the scope of the invention.

Example 1

In a quartz tube as a reactor, 20 mm. inside diameter and 750 mm. long was inserted a quartz tube, 6 mm. outside diameter for a thermocouple.

The front part of the reaction tube 300 mm. long forming an evaporating section was heated to 400° C.

The intermediate section, 300 mm. long forming a catalyst layer was packed with 85 cc. of the catalyst pellets and heated to 700±10° C.

The rear part, 150 mm. long was formed to a water cooling section.

The mixture of pulverized pumice and 5.6 weight percent thereof boric oxide powder, molded by compression into pellets of 6 mm. diameter and 5 mm. thick and then heated at 600° C. was employed as a catalyst.

The entire reaction system was controlled under the pressure of 145 mm. Hg (absolute), 1.92 grams of triethyl phosphate and 1.92 grams of carbon disulfide were dissolved in 127.7 grams (1.72 moles) of propionic acid, and the mixture was introduced portionwise into the reactor for a period of 1 hour, with a contact time of 0.430 second.

The resultant gas cooled at the rear part of reactor was led in into the collecting bottle containing xylene solution of aniline through the condenser at −20° C.

Methyl ketene was collected there as propionanilide. From the condenser were recovered 13.5 grams of unreacted propionic acid, and from the collecting bottle containing aniline were obtained 168.5 grams of propion anilide.

The yield of the produced methyl ketene was 65.5 percent based on starting propionic acid and 73.5 percent based on consumed propionic acid.

Example 2

The same device was used as Example 1, and were employed 85 cc. of the catalyst consisting of diatomaceous earth and 25 weight percent thereof boric oxide being mixed, compression-molded into pellets 45 mm. diameter 5 mm. thick and heated at 600° C.

The temperature of the catalyst layer was maintained at 700° C.±10° C., and the entire system was controled at an absolute pressure of 145 mm. Hg 1.45 grams of triethyl phosphate and 1.45 grams of carbon disulfide were dissolved in 96.7 grams (1.31 moles) of propionic acid and the solution was fed into the reactor portionwise in 1 hour with a contact time of 0.56 second.

From the condenser were recovered 16.8 grams of propionic acid and from the collecting bottle containing aniline were abtained 96.0 grams (0.657 mole) of propion anilide.

The yield of the resultant methylketene were 50.2 percent based on the starting propionic acid and 60.8 percent based on the consumed propionic acid.

Example 3

The same reactor was used as Example 1 in which the reactor was packed for the length of 140 mm. of the intermediate part of the reactor tube with 40 cc. of the catalyst consisting of pulverized "Celite," 15 weight percent thereof boric oxide and 3 weight percent magnesium oxide mixed, compression-molded into pellets, 4 mm. diameter, 5 mm. thick and heated at 600° C.

The reaction temperature was maintained at 670° C.±10° C., and the entire system at an absolute pressure of 146 mm. Hg. 1.57 grams of triethyl phosphate and 1.57 grams of carbon disulfide were dissolved in 104.5 grams (1.41 moles) of propionic acid and the resultant solution was fed portionwise into the reactor in 1 hour with the contact time of 0.253 second.

From the condenser were recovered 16.2 grams of unreacted propionic acid, and from the collecting bottle containing aniline were obtained 109.5 grams (0.935 mole) of propion anilide.

The yield of the resultant methylketene was 52.1 percent based on the starting propionic acid and 61.7 percent based on the consumed propionic acid.

Example 4

The same device was used as Example 1, except the detachment of the condenser to be used in recovering the unreacted propionic acid from the reacted gas.

As catalyst 85 cc. of pumice tablets 6 mm. diameter and 5 mm. thick prepared by compression-molding the powder thereof were employed.

The catalyst layer was maintained at 700° C.±10° C. and the entire system at an absolute pressure of 145 mm. Hg, 1.51 grams of triethyl phosphate and carbon disulfide respectively were dissolved in 100.5 grams (1.36 moles) of propionic acid, the resultant mixture thereof being introduced portionwise into the reactor in 1 hour with a contact time of 0.538 second.

The resultant gas from the reactor was immediately led into the collecting bottle containing aniline and from the solution therein were separated by washing with water 32.8 grams of unreacted propionic acid and 93.5 grams (0.627 mole) of the desired propion anilide.

The yield of methyl ketene were 46.1 percent based on the starting propionic acid and 68.5 percent based on that consumed.

Example 5

The same device as Example 4 was used. Pulverized pumice and 25 weight percent thereof ortho boric acid were mixed, compression-molded and heated at 600° C. The intermediate part of the reactor was packed with 40 cc. of said catalyst for a length of 140 mm., the reacting temperature being maintained at 660° C.±10° C., and the entire system under an absolute pressure of 145 mm. Hg.

1.93 grams of triethyl phosphate and carbon disulfide respectively were dissolved in 128.5 grams (1.46 moles) of isobutyric acid, and the resultant solution was introduced portionwise into the reactor in 1 hour, and reacted by contact for 0.246 second.

The reacted gas was immediately led into the collector containing aniline. By washing the collected liquid with water 41.8 grams of the unreacted isobutyric acid were separated and 98.5 grams (0.603 mole) of isobutyric anilide.

The yield of the dimethyl ketene were 41.3 percent based on the starting isobutyric acid and 61.3 percent based on that consumed.

*Example 6*

The same device was employed as Example 1. As the catalyst pulverized pumice and 5 weight percent thereof boric oxide were mixed, compression-molded into tablet, 6 mm. diameter, 5 mm. thick and heated at 600° C.

40 cc. of the resultant catalyst were packed in the length of 140 mm. of the intermediate part of the reactor, the reaction temperature being maintained at 650° C.±10° C., and the entire system under an absolute of 145 mm. Hg.

2.76 grams of triethylphosphate and carbon disulfide respectively were mixed in 184 grams (1.80 moles) of valeric acid, and the resultant solution was introduced portionwise into the reactor in 1 hour, with a contact time of 0.201 second. 560 grams of the unreacted valeric acid were recovered in the condenser and 145.5 grams (0.823 mole) of valeric anilide were separated at the collecting bottle containing aniline.

The yield of the resultant propyl ketene were 45.7 percent based on the starting valeric acid and 65.5 percent based on that consumed.

*Example 7*

The same device was employed as Example 1. As the catalyst pulverized kaolin and 3 weight percent thereof boric oxide were mixed, compression-molded into tablets, 6 mm. diameter, 5 mm. thick and heated at 600° C.

85 cc. of the resultant catalyst were employed, being maintained at 700° C.±10° C., while the entire system was maintained at an absolute pressure of 145 mm. Hg. 0.992 gram of triethylphosphate and carbon disulfide respectively were dissolved in 66.1 grams (0.893 mole) of propionic acid, and the resultant solution was introduced portionwise into the reactor in 1 hour with a contact time of 0.807 second.

From the condenser were collected 13.9 grams of the unreacted propionic acid, and from the collector containing aniline were separated 75.0 grams (0.503 mole) of propion anilide.

The yield of the resultant methyl ketene were 56.3 percent based on the starting propionic acid and 71.4 percent based on that consumed.

*Example 8*

The same device was employed as Example 1. As the catalyst synthetic aluminium silicate and 5 weight percent thereof boric oxide were mixed, compression-molded into tablets, 4 mm. diameter 5 mm. thick and heated at 600° C. 85 cc. of the resultant catalyst were employed being maintained at 700° C.±10° C., while the entire system was maintained at an absolute pressure of 150 mm. Hg. 278 grams of triethyl phosphate and carbon disulfide respectively were mixed with 185 grams (2.50 moles) of propionic acid and the resultant solution was introduced portionwise into the reactor in 1 hour with a contact time of 0.297 second.

From the condenser were recovered 46 grams of propionic acid and from the collector were separated 187 grams (1.25 moles) of propion anilide.

The yield of the produced methyl ketene were 50.0 percent based on the starting propionic acid and 66.5 percent based on that consumed respectively.

*Example 9*

The same device was employed as Example 1. 85 cc. of the catalyst consisting of the powder of diatomaceous earth fire brick, compression-molded into tablets, 6 mm. diameter, 5 mm. thick were employed, being kept at the temperature of 700° C.±10° C., while the entire system was maintained at an absolute pressure of 150 mm. Hg.

2.81 grams of triethyl phosphate and carbon disulfide respectively were mixed 187 grams (2.53 moles) of propionic acid, and the resultant solution was introduced portionwise into the reactor in 1 hour with a contact time of 0.294 second.

From the condenser were recovered 58 grams of propionic acid and from the collector were separated 152 grams (1.02 moles) of the desired propion anilide.

The yield of the resultant methyl ketene were 40.3 percent based on the starting propionic acid and 58.8 percent based on that consumed.

*Example 10*

The same device was employed as Example 1. The catalyst consisted of pulverized pumice and 5 weight percent thereof boric oxide, mixed, compression-molded into tablets, 6 mm. diameter, 5 mm. thick and heated at 600°. C.

40 cc. of the resultant catalyst were packed in the length of 140 mm. of the intermediate part of the reactor tube being maintained at 650° C.±10° C., while the entire system was maintained at an absolute pressure of 145 mm. Hg.

186 grams (1.82 moles) of pure valeric acid were introduced portionwise into the reactor in 1 hour with a contact time of 0.20 second.

From the condenser were recoved 56.0 grams of the unreacted valeric acid, and from the collector were separated 140.0 grams (0.791 mole) of valeric anilide.

The yield of the produced propyl ketene were 43.4 percent based on the starting valeric acid and 62.0 percent based on that consumed.

*Example 11*

The same device was employed as Example 1. The catalyst was consisted of pulverized pumice and 10 weight percent thereof boric oxide mixed, molded into tablets, 6 mm. diameter, 5 mm. thick, and heated at 600° C. 40 cc. of the resultant catalyst was employed being maintained at 700° C.±10° C., while the entire system was kept at an atmosphere pressure.

2.01 grams of triethyl phosphate and carbon disulfide respectively were mixed with 134 grams (1.81 moles) of propionic acid, and the resultant solution was introduced portionwise into the reactor in 1 hour with a contact time of 0.98 second.

From the condenser were recovered 31 grams of propionic acid and from the collector were separated 134 grams (0.899 mole) of propion anilide.

The yield of the produced methyl ketene were 49.7 percent based on the starting propionic acid and 64.7 percent based on that consumed.

What we claim is:

1. A process for manufacturing ketenes which comprises contacting at a temperature of from 400 to 900° C. for a time of from 0.01 to 3 seconds, a vapor of lower aliphatic carboxylic acid having from 3 to 6 carbon atoms and at least one hydrogen atom attached to the carbon atom of α-position with a silica-boric oxide catalyst of specific area less than 100 m.$^2$/g.

2. The process according to claim 1 conducted in the presence of trialkyl phosphate vapor and carbon disulfide vapor.

3. A process for manufacturing methyl ketene which comprises contacting at a temperature of from 400 to 900° C. for a time of from 0.01 to 3 seconds, a vapor of propionic acid with a silica-boric oxide catalyst a specific surface area of which being less than 100 m.$^2$/g.

References Cited

UNITED STATES PATENTS

| 1,870,104 | 8/1932 | Dreyfus | 260—585 |
| 2,108,829 | 2/1938 | Sixt et al. | 260—585 |
| 2,175,811 | 10/1939 | Loder | 260—585 |

FOREIGN PATENTS

| 854,102 | 11/1960 | Great Britain. |
| 28/1579 | 4/1953 | Japan. |

LEON ZITVER, *Primary Examiner.*

M. M. JACOB, *Assistant Examiner.*